Sept. 9, 1969  W. B. PIERCE  3,465,587

DIODE SENSORS FOR LIQUID LEVEL DETECTION

Filed Nov. 20, 1967

INVENTOR.
WILLIAM B. PIERCE
BY
*Ronald A. Anderson*
ATTORNEY.

3,465,587
Patented Sept. 9, 1969

3,465,587
DIODE SENSORS FOR LIQUID LEVEL DETECTION
William B. Pierce, Los Altos, Calif., assignor to the United States of America as represented by the United States Atomic Energy Commission
Filed Nov. 20, 1967, Ser. No. 686,002
Int. Cl. G01f 23/00
U.S. Cl. 73—295                                   3 Claims

ABSTRACT OF THE DISCLOSURE

Liquid level indicating device in which a plurality of diode sensors are serially connected along a probe which is vertically oriented in a liquid (cryogen). The change in conduction of an electrical current by the diodes immersed in the cryogen relative to those above the liquid causes a proportionate change in an electrical circuit connected in series which said diodes indicating the surface level along said probe.

BACKGROUND OF THE INVENTION

This invention relates to liquid level indicating devices, and more particularly pertains to a device employing junction diodes as sensors for detecting liquid levels.

The invention disclosed herein was made under, or in, the course of Contract No. AT(04–3)–400 with the United States Atomic Energy Commission.

Various types of sensors for detecting liquid levels, including liquid cryogen levels, are well known. Such sensors include capacitor, resistor, or thermistor hot wire, optical and mechanical types. It has been found that use of these known sensors results variously in liquid level detection systems that may be insensitive, inaccurate, inconsistent, unstable, complex, unwieldly or expensive, especially when used for sensing liquid cryogen levels. For example, capacitor sensors have been found to have high noise levels, low sensitivity, and to produce low signals; resistor sensors do not return to the same value after contact with a liquid cryogen, and they therefore do not consistently conduct equal currents for specifically applied voltages and temperatures; and thermistor sensors are inherently unstable and expensive.

SUMMARY OF THE INVENTION

According to the invention, therefore, various levels of a liquid cryogen in a container may be accurately detected by mounting a plurality of diodes on a probe in the container and serially connecting the diodes in the forward direction across a voltage source. A current is produced therethrough that represents the cryogen level. The cryogen level may be determined on a continuous basis to as fine a degree as desired by connecting diodes in series arrays with a vertical spacing proportioned to give the desired accuracy. A positive and highly reproducible indication is provided, since the forward conductivity of an ordinary signal junction diode is significantly less when in contact with a liquid, and in particular a liquid cryogen, than when it is in the ullage space above the liquid. The voltage necessary to initiate and sustain forward conduction in the ambient space immediately above a liquid cryogen is substantially the same as the voltage required for forward conduction at a temperature within the range of normal temperatures for junction diode operation. However, it is found that a "threshold" voltage must be exceeded to initiate forward conduction of a diode when it is in contact with a liquid cryogen, and that this voltage is relatively high as compared to the voltage required for conduction in the ambient space above the cryogen, so that the differential voltage effect is a positive indicator as to whether or not the diode is immersed in the cryogen or is in the vapor phase. Furthermore, initiation of forward conduction through a diode in contact with a liquid cryogen creates a condition in which a voltage lower than threshold voltage will sustain the conduction. The lower voltage is found to have a value that is approximately half of the threshold voltage, but substantially higher than the voltage required to sustain conduction in the ambient space above the cryogen. Repeated immersions of a diode in a liquid cryogen causes no detectable change or deterioration of any property of the diode; in particular, it is found that after repeated immersions, the electrical conductivity of the diode remains unchanged under specific voltage and temperature conditions.

It is an object of the invention to utilize a junction diode as a sensor for indicating the level of a liquid.

Another object is to accurately and repeatedly measure the level of a liquid cryogen within a container by means which are sensitive, simple and inexpensive.

Another object is to measure cryogen levels with a plurality of serially connected diode sensors.

Other objects and advantageous features of the invention will be apparent in the description of the specific embodiment thereof, given by way of example only, to enable one skilled in the art to readily practice the invention, and described hereinafter with reference to the accompanying drawing.

DESCRIPTION OF A PREFERRED EMBODIMENT

Figure 1:
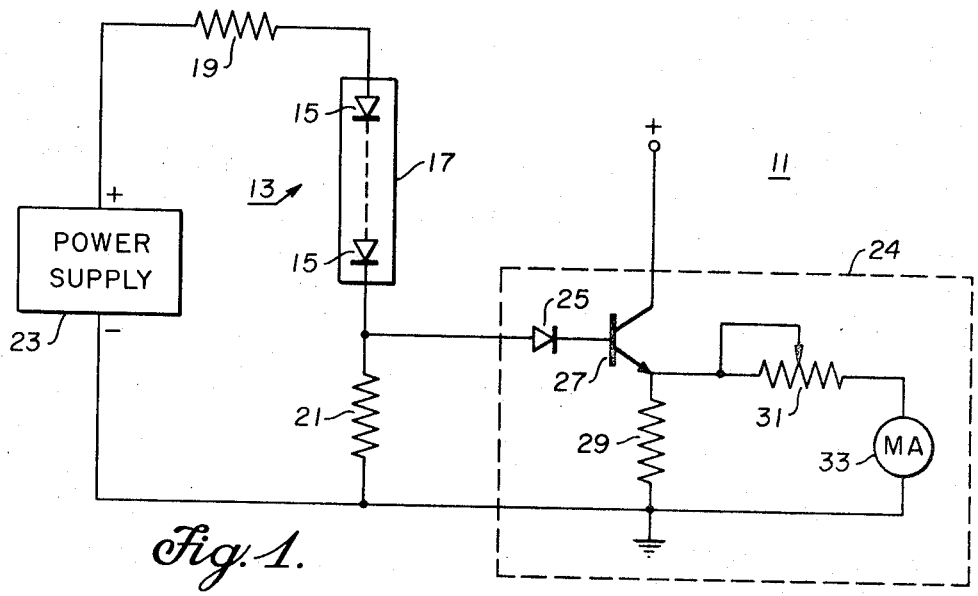
FIGURE 1 is a schematic diagram of a circuit utilizing a plurality of serially connected junction diode sensors for indicating the level of a liquid cryogen according to the invention.

With reference to FIGURE 1, a liquid level detecting and indicating system 11, in accordance with the invention, includes a probe 13 comprised of a plurality of serially connected junction diode sensors 15 mounted on a backing 17. The diodes 15 are connected in series with a limiting resistor 19 and a coupling resistor 21 across a power supply 23. A utilization circuit 24 is connected across the coupling resistor 21, and is comprised of a voltage-dropping diode 25 that connects the common point of the probe 13 and resistor 21 to the base of a transistor 27. A resistor 29 is connected to the emitter of the transistor 27, and the serial connection of the transistor 27 and resistor 29 are placed across a current source. A potentiometer 31 and milliammeter 33 are serially connected across the coupling resistor 29.

The probe 17 may be vertically mounted in a container of liquid, in particular a liquid cryogen, to enable the diodes 15 to act as sensors of the liquid level therein. It has been found that as long as a diode 15 is in the ullage space above the liquid cryogen, its electrical properties, particularly conductivity, are similar to those found when the diode is operating at room temperature. However, upon initial partial contact of a diode with the liquid cryogen, the thermal conductivity of the diode sharply increases. It has been discovered that this increased thermal conductivity causes the electrical properties of the diode to change radically. When a diode is in contact with a liquid cryogen, especially in the range of 20° K., application of a substantial threshold voltage increment is required to initiate conduction of the diode in the forward direction. After current conduction is initiated, the voltage required to sustain conduction is considerably less than the voltage required for conduction in the ullage space. Thus, with a changing level of liquids, as each diode 15 comes into contact with the liquid cryogen or is exposed only to the ullage space, the conduction of forward current through the diodes is correspondingly altered to fall or rise in discrete resistance and current level steps.

It is necessary that the power supply 23 have a voltage of sufficient magnitude to initiate and sustain conduction of current through the diodes 15 when all of the diodes are simultaneously in contact with the liquid cryogen and present a high total resistance. The limiting resistor 19 is therefore included to limit the sustained current through the diodes 15 to a value that is not destructive of the diodes.

Due to the discrete resistance step of each diode, the steady-state current through the serially connected diodes 15 is proportional to the number of diodes in contact with the liquid cryogen. A corresponding DC signal level is developed thereby across the resistor 21, and this level is proportional to the level of the liquid cryogen in the container. The signal is applied through the diode 25 to the base of the transistor 27 for development of the signal across the resistor 29 at a higher power level. The signal may be displayed on the milliammeter 33. The milliammeter readings are proportionately lower as more diodes are immersed in the cryogen; and alternatively, the milliammeter readings are higher as more diodes are exposed to the ambient space. Such readings are in accordance with a representative plot of diode probe current as a function of the liquid cryogen level shown in FIGURE 2, and the face of the milliammeter might then be calibrated to indicate a corresponding series of liquid levels in the container.

Figure 2:
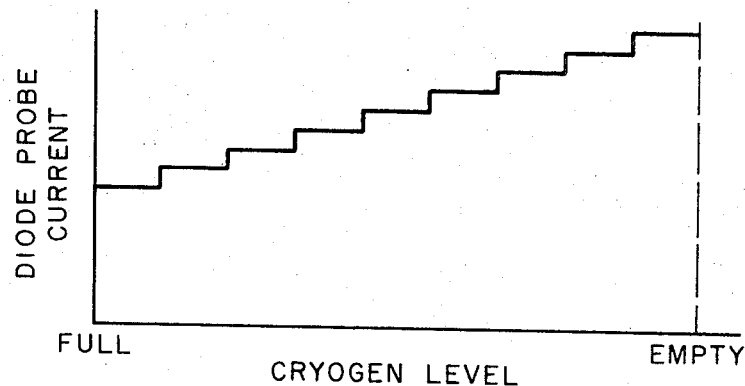
FIGURE 2 is a graph of the current through the diode sensors of FIGURE 1 as a function of the level of a liquid cryogen in a container in which the sensors are mounted.
Figures 3, 4:
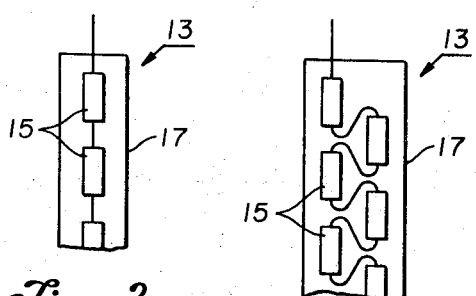
FIGURE 3 is a front view of a probe having the diode sensors of FIGURE 1 mounted thereon in a first arrangement.
FIGURE 4 is a front view of a probe having the diode sensors of FIGURE 1 mounted thereon in a staggered array.

The plot shown in FIGURE 2 is representative of discrete voltage steps that would be obtained with use of a probe 13 arranged with eight diodes 15 spaced apart on the backing 17 in the manner shown in FIGURE 3. The horizontal length of the current steps represents the intervening space between the ends of adjacent diodes, plus the length of each diode. The cryogen must rise or fall this distance before contacting or exposing successive diodes, so as to indicate the liquid level. Greater precision is obtained by reducing the spacing between the diodes 15, and even closer approximations can be obtained by horizontally offsetting serially connected diodes so that successive diodes vertically overlap, providing smaller effective incremental spacings. An example of such an arrangement is shown in FIGURE 4. Still smaller current steps, and therefore as fine a reading as is desired, could be obtained by providing additional staggered rows of diodes.

While the invention is described with particular relation to liquid cryogen level detection, it is contemplated that the invention may be further utilized for detection of levels of various liquids over a wide range of temperatures including, for example, the liquid levels of domestic water supply tanks, provided an appropriate diode is employed.

A liquid cryogen level detecting and indicating system exemplifying the invention has been constructed for indicating the level of liquid hydrogen in a 100-liter Dewar. This system includes a probe of the type shown in FIGURE 3, made of a fiberboard backing on which 32 diodes of the Continental Devices type 1N3064 are mounted. The power supply is rated at 300 volts, the limiting resistor 19 has a nominal value of 15K ohms, and the coupling resistor 21 has a nominal value of 1K ohms. With liquid hydrogen in the Dewar, it is found that approximately 10 volts are required to initiate current conduction through each diode that is in contact with the cryogen, that approximately 8 volts are required to sustain current through each diode in contact with the liquid hydrogen, and that approximatley one volt is required for current conduction through each diode in the ambient space above the liquid hydrogen. The utilization circuit 24 includes the following components: the voltage-dropping diode 25 is a 1N3064 silicon diode, manufactured by Continental Devices Corp., the transistor 27 is a type 2N1711, the resistor 29 has a nominal value of 2K ohms, the potentiometer 31 has a range from zero to 5K ohms, and the milliammeter has a scale ranging from zero to 1 ma.

While a preferred embodiment of the invention has been shown and described, further embodiments or combinations of those described herein will be apparent to those skilled in the art without departing from the spirit of the invention.

I claim:
1. In a system for detecting the level of a liquid in a container, the combination comprising:
 (a) a first junction diode mounted within said container
 (b) a voltage source connected across said diode for initiating and sustaining forward current conduction through said diode, the sustained electrical conduction through said diode being at a first forward current level when the diode is exposed to ullage space above the surface of said liquid, the sustained electrical conduction through said diode being at a second forward current level less than said first current level when said diode is in contact with said liquid, said voltage source supplying first, second and third voltage levels across said diode, said first voltage level being required to sustain said first current level when said diode is exposed to ullage space, said second voltage level being higher than said first voltage level and required to sustain said second current level when said diode is in contact with said liquid, and said third voltage level being higher than said second voltage level and required to initiate forward current conduction at a level less than said second current level when said diode is in contact with said liquid; and
 (c) a plurality of junction diodes serially connected with said first diode across said voltage source, all of said diodes being positioned at successive vertical levels within said container, said voltage source being operable for applying said first, second and third voltage levels across all said serially connected diodes.

2. The combination of claim 1, wherein successive individual diodes are mounted at separate vertical levels in said container.

3. The combination of claim 1, wherein successive individual diodes are mounted in staggered array at overlapping vertical levels in said container.

References Cited

UNITED STATES PATENTS 3,097,496 7/1963 Petts.
3,132,515 5/1964 Urban _____ 73—295

S. CLEMENT SWISHER, Primary Examiner